United States Patent [19]

Schmid et al.

[11] 4,000,818
[45] Jan. 4, 1977

[54] ARRANGEMENT PERMITTING OF A STORAGE AND REMOVAL OF PROFILED MEMBERS

[75] Inventors: Peter-Jens Schmid; Viktor Lattmanig, both of Vienna, Austria

[73] Assignee: Peter-Jens Schmid, Vienna, Austria

[22] Filed: Mar. 13, 1975

[21] Appl. No.: 557,937

[30] Foreign Application Priority Data

Mar. 13, 1974 Austria .............................. 2112/74
Mar. 13, 1974 Austria .............................. 2111/74

[52] U.S. Cl. .............................. 214/1 P; 193/32; 214/8.5 K; 221/310
[51] Int. Cl.² .............................. B65G 59/04
[58] Field of Search ............ 214/1 P, 8.5 H, 8.5 K; 193/32; 221/277, 307, 310

[56] References Cited

UNITED STATES PATENTS

| | | | |
|---|---|---|---|
| 3,034,626 | 5/1962 | Kay | 198/32 |
| 3,623,618 | 11/1971 | Shaw | 214/8.5 K |
| 3,800,980 | 4/1974 | Orimoto | 214/8.5 K X |

Primary Examiner—Robert J. Spar
Assistant Examiner—George F. Abraham
Attorney, Agent, or Firm—Imirie, Smiley & Linn

[57] ABSTRACT

Apparatus permitting of a storage and removal of profiled members, such as rods, tubes or the like, in which at least two spaced apart parallel comb-like holders are provided, which have vertical comb tooth spaces which are aligned with each other and have a width which is substantially as large as the width of the profiled members in storage so that the same are individually vertically stacked with central symmetry. The holders are combined in blocks in which the aligned comb tooth spaces have the same width or different widths to enable a holding of profiled members having equal or different widths.

3 Claims, 5 Drawing Figures

4,000,818

ARRANGEMENT PERMITTING OF A STORAGE AND REMOVAL OF PROFILED MEMBERS

SUMMARY OF THE INVENTION

Arrangement for storing profiled members. Blocks are provided, which comprise uprights which protrude upwardly from a base and define rows of comb tooth spaces. The comb tooth spaces of successive rows are aligned with each other and have a width which is substantially as large as the width of said members so that the same are individually stacked with central symmetry.

This invention relates to an arrangement which permits of a storage and removal of profiled members, such as rods, tubes or the like. At least two spaced apart parallel comblike holders are provided, which have vertical comb tooth spaces, which are aligned with each other.

The storage of such products and their removal from storage involves difficulties for manufacturers and for wholesale and retail traders. Most of the known arrangements permit only of a storage of the members ordered in dependence on their cross-section, wall thickness, quality, length or other characteristic features. It is usual to hold similar products together in a bundle. Difficulties are involved even in the correct incorporation of the members in these bundles and particularly in the proper removal of members from these bundles, in which the members are mostly interlaced. Profiled members are produced and stored in predetermined lengths. Because only partial lengths are often required and the remainders are stored again, the proper selection of the members to be removed is time-consuming.

It is an object of the invention to provide an arrangement which permits of a clearly ordered storage of the above-mentioned products which permits of a deposition and removal of the products in a simple manner and under control of an electronic data-processing plant. The additional use of an electronic data-processing plant results in an optimum arrangement of the stored products after their manufacture so that the waste of material is reduced to a minimum percentage.

At the same time, the taking of orders and the delivery can be performed automatically and staff may be saved.

This object is accomplished according to the invention by an arrangement in which the width of the comb tooth spaces is substantially as large as the width of the profiled members in storage so that the same are individually stacked with central symmetry.

It is another feature of the invention that the holders are combined in blocks in which the aligned comb tooth spaces have the same or different widths to permit of a storage of profiled members having equal or different widths.

In the arrangement according to the invention, profiled members having certain characteristics as regards the width of the stored material can be stored in a clear order in each comb tooth space or in specific groups of comb tooth spaces whereas cut-off pieces can be stored in the appropriate block in dependence on their width and/or length. As a result, each profiled member can be stored in the comb tooth spaces which have the same width as the member. According to a further feature of the invention, the width of mutually aligned comb tooth spaces may differ, preferably in groups, to enable a storage of profiled members which differ in width.

The stacking of similar members facilitates the removal of the elements, which can be removed upwardly or downwardly or toward both sides of the spaces. Where a removal in an upward direction is desired, a particularly desirable embodiment of the arrangement according to the invention may be used in which at least one crane is provided above the storage area and comprises a bridge carrying at least two grippers arranged one behind the other. The bridge is movable on trolleys parallel to the combs and the grippers are adjustable, if desired, in the longitudinal direction of the products. In this manner, a plurality of profiled members can be stored or removed at the same time and only the lowermost one of a plurality of members which have been removed may be deposited whereas the remaining members are returned into the comb tooth spaces. This possibility is of special advantage in cases where a plurality of profiled members are contained in one comb tooth space, for any reason whatever.

In cases in which a removal in a downward direction is desired, it is a further feature of the invention to provide locking means which can be disabled and are disposed at the lower portion of the comb tooth spaces. The locking means which can be disabled may consist, e.g., of sliders, latches, or notched wheels or the like which have a peripheral portion extending into the comb tooth spaces.

Further features and embodiments of the arrangement according to the invention will now be explained more fully with reference to the drawings which shows some embodiments by way of example.

DESCRIPTION OF THE PREFERRED EMBODIMENTS

Figure 3:
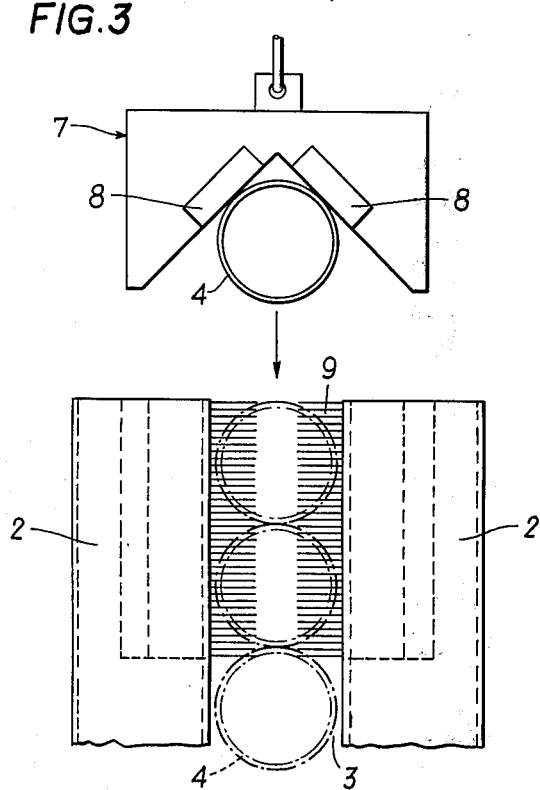
FIG. 3 is an enlarged view showing the loading side of a comb tooth space with a crane and braking means.

As is apparent from the drawing, the arrangement comprises a plurality of comblike holders 1, which are spaced one behind the other. Each holder comprises a plurality of laterally spaced apart uprights 2, which define comb tooth spaces 3 for receiving profiled members 4, such as tubes, which are to be stored. The comb tooth spaces 3 of all holders are vertical and are mutually aligned so that juxtaposed aligned rows of spaced apart comb tooth spaces 3 are provided which have a width that is equal to the width of the profiled members in storage. In the present case, the width of the comb tooth spaces 3 is equal to the diameter of the tubes. In this context the term "substantially" is used to indicate that there is only a small clearance laterally of the profiled members so that the products to be stored can easily be introduced into the comb tooth spaces and nevertheless the profiled members 4 are individually stacked with central symmetry in the rows of comb tooth spaces, as is apparent from FIGS. 3 and 4, and in the present case, where tubes are stored, their center lines lie in a common vertical plane.

Figure 4:
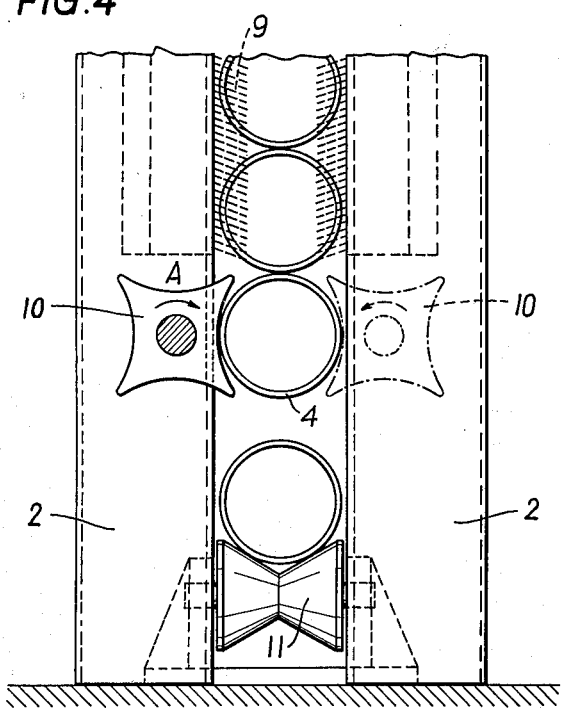
FIG. 4 shows the unloading side of the comb tooth space shown in FIG. 3 and is drawn to the same scale as FIG. 2.

Above the holders 1, a handling system is provided which serves to introduce the products to be stored into the comb tooth spaces 3. The handling system takes the products to be stored from a feed roller conveyor 5 and deposits the products in the desired row of comb tooth spaces. In the embodiment shown by way of example in FIGS. 1 to 4, a revolving endless chain 6 is provided, from which spaced apart grippers 7 are suspended, which for the sake of simplicity are shown as magnetic grippers having solenoids 8 which can be electrically energized to attract steel tubes 4 and which release said tubes when deenergized. It will be understood that grippers of any other kind, such as the grippers having two gripper jaws 7a, 7b shown in FIG. 5, may be used to grip the products to be stored.

Where grippers are used which release the products above the comb tooth spaces 3, it is desired to reduce the velocity of all of the products to be stored. For this reason, friction brakes are provided, which are apparent from FIGS. 3 and 4 and which in the present case consist of brushes 9 which extend throughout the height of the comb tooth space 3 or as shown, over a portion of the height at the receiving end (FIG. 3) and a portion of the height adjacent to the lower end (FIG. 4).

The profiled members can be removed from the comb tooth spaces 3 in an upward or downward direction. In the embodiment here described, means are provided which permit of a removal in the downward direction. For this purpose each upright is provided with a notched wheel 10 either on one side of the comb tooth space or, as is indicated in dotted lines in FIG. 4, on both sides of the comb space. The notched wheel has a peripheral portion which protrudes into the comb tooth space 3 and serves also to hold the profiled members 4. Driven rollers for delivering removed profiled members onto a roll table are provided below the notched wheels 10, preferably at the lower end of the comb tooth spaces 3 or between them.

The arrangement which has been described may be used in the following manner: The profiled members 4 to be stored move on the feed roller conveyor 5 into the range of the grippers 7 which are suspended from the chain 6. These grippers grip the profiled member 4 and move it to a position over a predetermined comb tooth space 3. In this position the profiled member is released. These operations may be controlled by an electronic data-processing system. When the member 4 has been released, it falls into the comb tooth spaces 3 and is braked by the brushes 9 or the like. The stacked profiled members 4 which are stacked in the comb tooth spaces 3 are supported by that profiled member which rests on the notched wheel 10 or notched wheels 10. The profiled members are stacked with central symmetry so that the center lines of tubes or similar elements lie in a common vertical plane. If a profiled member 4, in the present case a tube, is required from one row of comb tooth spaces, the notched wheels 10 which carry the tube are rotated through 90° in the direction of the arrows A shown in FIG. 4 so that the profiled member carried by the notched wheels is downwardly released and the next following profiled member comes to rest on the notched wheels in position ready for delivery. The released profiled member is received by the rollers 11, at least some of which are driven and which carry off the profiled member in the direction of its axis or transfer it to the roll table 12, which moves the profiled member via another roller conveyor to a cutting plant or directly to a packaging plant.

Areas for the storage of tubes differing in lengths may be provided with so-called blocks and individual ones or groups of these blocks may be associated with different lengths of materials. Each of these blocks is provided with a number of holders 1 which are arranged one behind the other and carried by a base. For instance, if a block is intended to store tubes 30 meters long and two holders are spaced apart by a distance $a$ of 4 meters (FIG. 2), eight holders would be required for this block and each tube would protrude 1 meter at each end. Such storage areas would be particularly suitable for the storage of profiled members in cases in which partial lengths of a profiled member might be cut off whereas the remainder is returned to storage. In this case a profiled member having a length of 20 meters, e.g., might be cut from a member removed from the block intended for members 30 meters long and the remainder of the member could then be stored in the block intended for profiled members 10 meters long.

Figure 1:
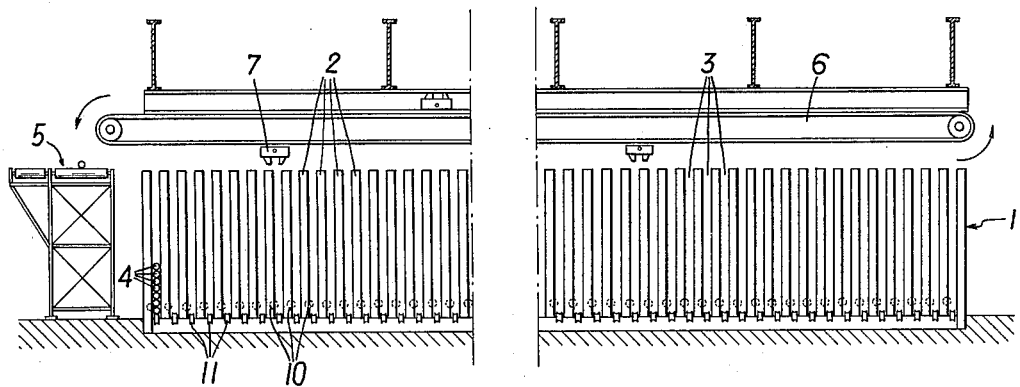
FIG. 1 is a front elevation showing one embodiment of the arrangement according to the present invention.
Figure 2:
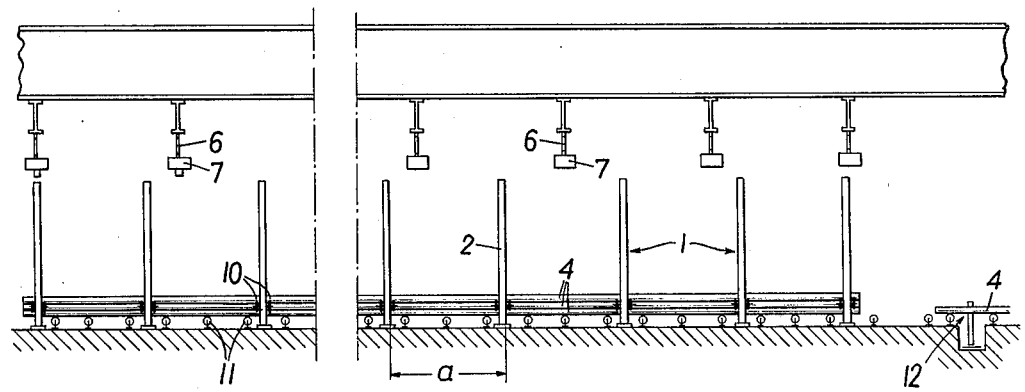
FIG. 2 is a side elevation showing the arrangement of FIG. 1.
Figure 5:
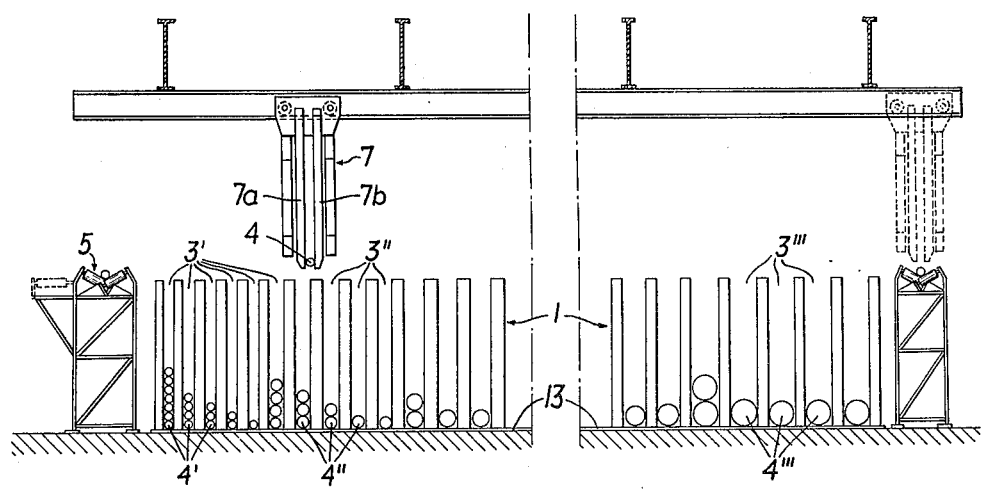
FIG. 5 is a front elevation showing a modified embodiment of the arrangement according to the invention.

It is also possible to provide rows of comb tooth spaces for the storage of profiled members differing in width. In the arrangement shown in FIG. 5, viewed from left to right, the five first rows of comb tooth spaces 3' are intended for tubes 4' which are smallest in diameter. The five following rows of comb tooth spaces 3'' are intended for tubes 4'' larger in diameter etc.. The last five comb tooth spaces 3''' are intended for tubes 4''' largest in diameter. FIG. 5 shows a base 13 which can be moved together with the holder 1 and suggests the use of block of holders.

A plurality of arrangements in accordance with the embodiments which have been described may be arranged one over the other, in a plurality of storeys, and handling means may be provided which move the product in storage from one storey to another or to the delivery station or from the feed roller conveyor to the appropriate storey, where the products to be stored are received by a chain of the kind described hereinbefore and moved into the desired comb tooth spaces.

We claim:

1. An arrangement permitting of a storage and removal of profiled members, comprising a multiplicity of blocks provided with means for storing said members in vertical rows, each of said blocks being provided with means which form vertical comb tooth spaces, said blocks comprising a base and uprights which protrude upwardly from said base and which are aligned to form at least two spaced apart rows, in which each of said comb tooth spaces is defined by two of said uprights, each comb tooth space in each of said rows being aligned with a comb tooth space of another row so that profiled members can be stored in both said comb tooth spaces, the width of said aligned comb tooth spaces being substantially as large as the width of the profiled members to be stored therein so that the same are constrained to follow a linear path in each row of aligned comb tooth spaces, release means in each of said comb tooth spaces to prevent the downward movement of the profiled members along said linear path and operable to release a lowermost one of the profiled members while retaining succeeding profiled members, exit means disposed under each comb tooth space in line with said linear path and including driven rollers which are rotatable about an axis which is transverse to the longitudinal direction of said members for carrying off members in their longitudinal direction upon release thereof by said release means, and brushes protruding from the sides of said uprights into the comb tooth spaces to brake the profiled members as they fall along said linear path.

2. An arrangement according to claim 1, wherein said comb tooth spaces differ in width so as to receive members of different dimensions.

3. An arrangement according to claim 1, wherein the spacing between said two spaced apart rows of each of said blocks corresponds to the length of profiled members to be stored therein whereby profiled members of differing lengths may be stored in separate, easily identifiable blocks.

* * * * *